(12) United States Patent
Steenhoek et al.

(10) Patent No.: US 8,441,641 B1
(45) Date of Patent: May 14, 2013

(54) METHOD FOR COLOR MEASUREMENT

(76) Inventors: Larry Eugene Steenhoek, Wilmington, DE (US); Arun Prakash, West Chester, PA (US)

( * ) Notice: Subject to any disclaimer, the term of this patent is extended or adjusted under 35 U.S.C. 154(b) by 174 days.

(21) Appl. No.: 13/091,389

(22) Filed: Apr. 21, 2011

Related U.S. Application Data (60) Provisional application No. 61/326,341, filed on Apr. 21, 2010.

(51) Int. Cl.
*G01J 3/46* (2006.01)

(52) U.S. Cl.
USPC ......................................... 356/402

(58) Field of Classification Search ........... 356/402–425
See application file for complete search history.

(56) References Cited

U.S. PATENT DOCUMENTS

| | | | |
|---|---|---|---|
| 5,844,680 A * | 12/1998 | Sperling | 356/303 |
| 7,466,415 B2 | 12/2008 | Gibson et al. | |
| 7,659,994 B2 | 2/2010 | Sperling | |
| 7,688,447 B2 * | 3/2010 | Shakespeare et al. | 356/402 |
| 2008/0297791 A1 | 12/2008 | Imura | |
| 2009/0046300 A1 | 2/2009 | Schwarz et al. | |
| 2009/0122316 A1 | 5/2009 | Sperling et al. | |

* cited by examiner

*Primary Examiner* — Tara S Pajoohi Gomez
(74) *Attorney, Agent, or Firm* — Sudhir G. Deshmukh (57) ABSTRACT

The present disclosure is directed to a method for producing color spectral data of an article illuminated with lights emitted from one or more light emitting units, such as light emitting diodes (LEDs). The method is useful for obtaining accurate color spectral data of the article and for matching the color data produced from another color measuring instrument. The method is particularly useful for obtaining color spectral data using light emitting diodes as light source for color measurement. This disclosure is also directed to a color measuring system using the method disclosed therein.

19 Claims, 4 Drawing Sheets

METHOD FOR COLOR MEASUREMENT

FIELD OF DISCLOSURE

The present disclosure is directed to a method for producing color spectral data. The disclosure is particularly directed to a method for producing color spectral data of an article illuminated with lights emitted from one or more light emitting units. This disclosure is also directed to a color measuring system using the method.

BACKGROUND OF DISCLOSURE

Articles such as vehicle bodies or vehicle body parts can have a variety of colors and appearance. Surface coatings such as monocoat, colorcoat or basecoat, clearcoat or topcoat, and tricoat are favored for the protection and production of decorative colors. The surface coatings can utilize one or more pigments or effect pigments to impart the desired color or appearance. Accurate and reproducible measurements of colors of the articles are challenging. A number of commercial color systems and devices have been developed for measuring colors and other optical properties of articles, such as surface coatings of the vehicle bodies or body parts. However, there are significant variations in color measurement data among systems or devices. There are still needs for improved method for color measurement.

STATEMENT OF DISCLOSURE

This disclosure is directed to a method for producing color spectral data of an article, said method comprising the steps of:

a) measuring individual specimen reflection intensity data $S_n$ of lights emitted from a number n light unit of the first set of one or more light emitting units and reflected by the article using one or more detectors, the $S_n$ is measured over a range of wavelength $\lambda$ and under a voltage $U_n$ applied to the number n light unit;

b) obtaining individual characterized spectral power distribution data $SPDC_{n,\lambda,t}$ of the number n light unit, the $SPDC_{n,\lambda,t}$ characterizes the number n light unit over the range of wavelength $\lambda$, at one or more known temperatures t and under one or more individual voltages $V_{n,t}$ applied to the number n light unit;

c) generating individual raw spectral power distribution data $SPDR_{n,\lambda}$ of the number n light unit based on the $SPDC_{n,\lambda,t}$ and the $U_n$;

d) generating individual normalized spectral power distribution data $SPDN_{n,\lambda}$ of the number n light unit by normalizing the $SPDR_{n,\lambda}$;

e) obtaining an individual white normalization factor $W_n$ of the number n light unit;

f) repeating the steps of a) through e) for a k number light units of the first set of one or more light emitting units; and g) producing a high resolution spectrum $H_\lambda$ for said k light units by a process comprising the steps of:

g1) generating a $COG_n$ of the number n light unit using the formula (i):

$$COG_n = \frac{\sum_{\lambda=380}^{760} \lambda \times SPDN_{n,\lambda}}{\sum_{\lambda=380}^{760} SPDN_{n,\lambda}}; \quad (i)$$

g2) generating a specimen reflectance value $L_n$ unit using the formula (ii):

$$L_n = S_n \times W_n \quad (ii);$$

g3) generating a spectral optimization seed value $T_\lambda$ by interpolating the $COG_n$ and the $L_n$;

g4) optionally, generating an initial medium resolution spectrum $M_\lambda$ based on the $T_\lambda$;

g5) generating an initial high resolution spectrum $H_\lambda$ by interpolating from the spectral optimization seed value $T_\lambda$, or optionally from the initial medium resolution spectrum $M_\lambda$;

g6) calculating an estimated low resolution reflectance value $E_n$ at each $COG_n$ using the formula (iii):

$$E_n = \sum_{\lambda=380}^{760} H_\lambda \times SPDN_{n,\lambda}; \quad (iii)$$

g7) calculating an error function $\Delta$ using the formula (iv):

$$\Delta = \sum_{n=1}^{k} (E_n - L_n)^2; \quad (iv)$$

g8) adjusting the spectral optimization seed value $T_\lambda$ to a subsequent $T_\lambda$, or optionally adjusting the initial medium resolution spectrum $M_\lambda$ to a subsequent $M_\lambda$, and repeating steps g5) through g7) using the subsequent $T_\lambda$ to replace the spectral optimization seed value $T_\lambda$ or using the subsequent $M_\lambda$ to replace the initial medium resolution spectrum $M_\lambda$, if the error function $\Delta$ in step g7) is not converged; and g9) producing said high resolution spectrum $H_\lambda$ based on the spectral optimization seed value $T_\lambda$ or the subsequent $T_\lambda$, or optionally, based on said initial medium resolution spectrum $M_\lambda$ or said subsequent $M_\lambda$, when the error function $\Delta$ is converged;

wherein:

k is the number of the light emitting units measured;

n is an index of the light emitting units and is in a range of from 1 to k;

$\lambda$ is a wavelength of lights in a range of from 380 nm to 760 nm.

This disclosure is further directed a color measuring system for producing color spectral data of an article, said color measuring system comprising one or more light emitting units and a computing program product causing said color measuring system performing a computing process according to any of the methods disclosed herein.

BRIEF DESCRIPTION OF DRAWING

FIG. 1 shows a schematic presentation of an example of the method. A) Steps a) through g). B) Steps g1) through g10).

FIG. 2 shows representative examples of color spectral data produced by a target color measuring instrument (triangle) and by the method of this disclosure (solid circle). (A) Initial color data. Color data after 2 iterations (B), 4 iterations (C) and finally converged data (D).

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

k is the number of light emitting units and can be in a range of from 1 to 100.

n is an index of light emitting units and can be in a range of from 1 to k.

j is a spectral element index of the final spectrum $F_j$.

$\lambda$ is a wavelength of lights.

t is a temperature index of the light emitting unit.

$V_{n,t}$ is a voltage of the number n light emitting unit at a known temperature t.

$U_n$ is a voltage of the number n light emitting unit at an unspecified or unknown temperature.

$COG_n$ is a wavelength "center of gravity" of the number n light emitting unit.

$W_n$ is a white normalization factor of the number n light emitting unit.

$WR_n$ is a reflectance factor of a white reference standard. Typically, a value of 1 can be the perfect white value.

$T_\lambda$ is a spectral optimization seed value.

$S_n$ is a reflection intensity data of lights emitted from the number n light emitting unit and reflected by a specimen, such as a reference standard or the surface of an article, at a desired geometry.

$L_n$ is a low resolution reflectance value of the number n light emitting unit.

$M_\lambda$ is a medium resolution reflectance spectrum. The $M_\lambda$ can be typically at a resolution of 5-10 nm.

$H_\lambda$ is a high resolution reflectance spectrum. The $H_\lambda$ can be typically at a resolution of 0.5-5.0 nm.

$E_n$ is an estimated low resolution reflectance value of the number n light emitting unit.

$\Delta$ is an error function.

$F_j$ is the color spectral data, also referred to as "color spectrum" or "color spectra".

$B_{j,\lambda}$ is a slit function of a target color measuring instrument.

$SPDR_{n,\lambda}$ is a raw spectral power distribution of the number n light emitting unit.

$SPDN_{n,\lambda}$ is a normalized spectral power distribution of the number n light emitting unit.

$SPDC_{n,\lambda,t}$ is a characterization spectral power distribution of the number n light emitting unit at the temperature t.

This disclosure is directed to a method for producing color spectral data of an article. The article can be illuminated with lights emitted from a first set of one or more light emitting units. The method can comprise the steps of:

a) measuring individual specimen reflection intensity data $S_n$ of lights emitted from a number n light unit of a first set of one or more light emitting units and reflected by said article using one or more detectors, said $S_n$ is measured over a range of wavelength $\lambda$ and under a voltage $U_n$ applied to said number n light unit;

b) obtaining individual characterized spectral power distribution data $SPDC_{n,\lambda,t}$ of said number n light unit, said $SPDC_{n,\lambda,t}$ characterizes the number n light unit over the range of wavelength $\lambda$, at one or more known temperatures t and under one or more individual voltages $V_{n,t}$ applied to said number n light unit;

c) generating individual raw spectral power distribution data $SPDR_{n,\lambda}$ of said number n light unit based on said $SPDC_{n,\lambda,t}$ and the $U_n$;

d) generating individual normalized spectral power distribution data $SPDN_{n,\lambda}$ of the number n light unit by normalizing said $SPDR_{n,\lambda}$;

e) obtaining an individual white normalization factor $W_n$ of the number n light unit;

f) repeating the steps of a) through e) for k light units of said one or more light emitting units; and g) producing a high resolution spectrum $H_\lambda$ for said k light units by a process comprising the steps of:

g1) generating a $COG_n$ of the number n light unit using the formula (i):

$$COG_n = \frac{\sum_{\lambda=380}^{760} \lambda \times SPDN_{n,\lambda}}{\sum_{\lambda=380}^{760} SPDN_{n,\lambda}}; \quad (i)$$

g2) generating a specimen low resolution reflectance value $L_n$ using the formula (ii):

$$L_n = S_n \times W_n \quad (ii);$$

g3) generating a spectral optimization seed value $T_A$ by interpolating said $COG_n$ and said $L_n$;

g4) optionally, generating an initial medium resolution spectrum $M_\lambda$ based on the $T_\lambda$;

g5) generating an initial high resolution spectrum $H_\lambda$ by interpolating from the spectral optimization seed value $T_\lambda$, or optionally from the initial medium resolution spectrum $M_\lambda$;

g6) calculating an estimated low resolution reflectance value $E_n$ at each $COG_n$ using the formula (iii):

$$E_n = \sum_{\lambda=380}^{760} H_\lambda \times SPDN_{n,\lambda}; \quad (iii)$$

g7) calculating an error function $\Delta$ using the formula (iv):

$$\Delta = \sum_{n=1}^{k} (E_n - L_n)^2; \quad \text{(iv)}$$

g8) adjusting the spectral optimization seed value $T_\lambda$ to a subsequent $T_\lambda$, or optionally adjusting the initial medium resolution spectrum $M_\lambda$ to a subsequent $M_\lambda$, and repeating steps g5) through g7) using the subsequent $T_\lambda$ to replace the spectral optimization seed value $T_\lambda$ or using the subsequent $M_\lambda$ to replace the initial medium resolution spectrum $M_\lambda$, if the error function $\Delta$ in step g7) is not converged; and g9) producing said high resolution spectrum $H_\lambda$ based on the spectral optimization seed value $T_\lambda$ or the subsequent $T_\lambda$, or optionally, based on said initial medium resolution spectrum $M_\lambda$ or said subsequent $M_\lambda$, when the error function $\Delta$ is converged;

wherein:

k is the number of the light emitting units measured;

n is an index of the light emitting units and is in a range of from 1 to k;

$\lambda$ is a wavelength of lights in a range of from 380 nm to 760 nm.

In step a) (101) (FIG. 1A), raw reflectance can be measured. Each of the light emit units can be individually controlled electronically and be turned on and off individually. Each of the light emit units can produce lights at the same or different wavelengths. The light emitting units can include incandescent light bulbs, light emitting diodes (LEDs) or other light emitting devices or light sources. Light emitting diodes (LEDs) can be preferred. LEDs that produce lights at different wavelengths that cover the range of wavelength $\lambda$ can be preferred. It is preferred that the light emitting units can be turned on and off in a predetermined sequential order. An optical or mechanical device can also be used to direct the light from one light unit to the surface of the article, or to collect the light reflected from the surface of the article at a specific wavelength or a range of wavelengths. The optical or mechanical device can be configured to direct or collect light from each of the light emitting units individually. The optical or mechanical device can also be configured to control light wavelength, for example to disperse a white light into a spectrum of lights. A combination of electronically controlled light units and the optical or mechanical device can also be suitable. One or more detectors can be positioned to detect and measure the reflectance of the lights emitted from the light unit that is turned on and reflected by the surface of the article. The light emitting units can be arranged to produce lights illuminating the article surface at a predetermined angle. In one example, the light emitting units can be arranged at 45° angle or other angles determined appropriate by those skilled in the art. The individual specimen reflection intensity data $S_n$ can be measured over a range of wavelength $\lambda$, such as in a range of from 380 nm to 760 nm, and with a voltage $U_n$ applied to the light unit, using one or more detectors.

The light emitting units, such as the LEDs, can produce lights that have overlapping wavelengths so that a plurality of LEDs can contribute to lights at a specific wavelength point or a range of wavelengths. In one example, 5-40 LEDs can produce lights in the wavelength in a range of from 380 nm to 760 nm. In another example, 2-6 LEDs can produce lights at one wavelength point or a range of wavelengths, such as at a wavelength 450 nm±50 nm. A same set of a different set of LEDs can produce light at different wavelengths.

White lights having mixed wavelengths can also be suitable. The white lights can be used in combination with one or more filters or devices so that the individual specimen reflection intensity data $S_n$ can be measured at one or more selected wavelength points over the range of wavelength $\lambda$.

In step b) (102) (FIG. 1A), characteristics of the light emitting units can be obtained. The $SPDC_{n,\lambda,t}$ can be obtained from a manufacturer or a provider of a color measuring device, or from a manufacturer or provider of the light emitting units. Typically, the $SPDC_{n,\lambda,t}$ of a commercial color measuring device can be obtained from the manufacturer of the device.

Figure 1A:
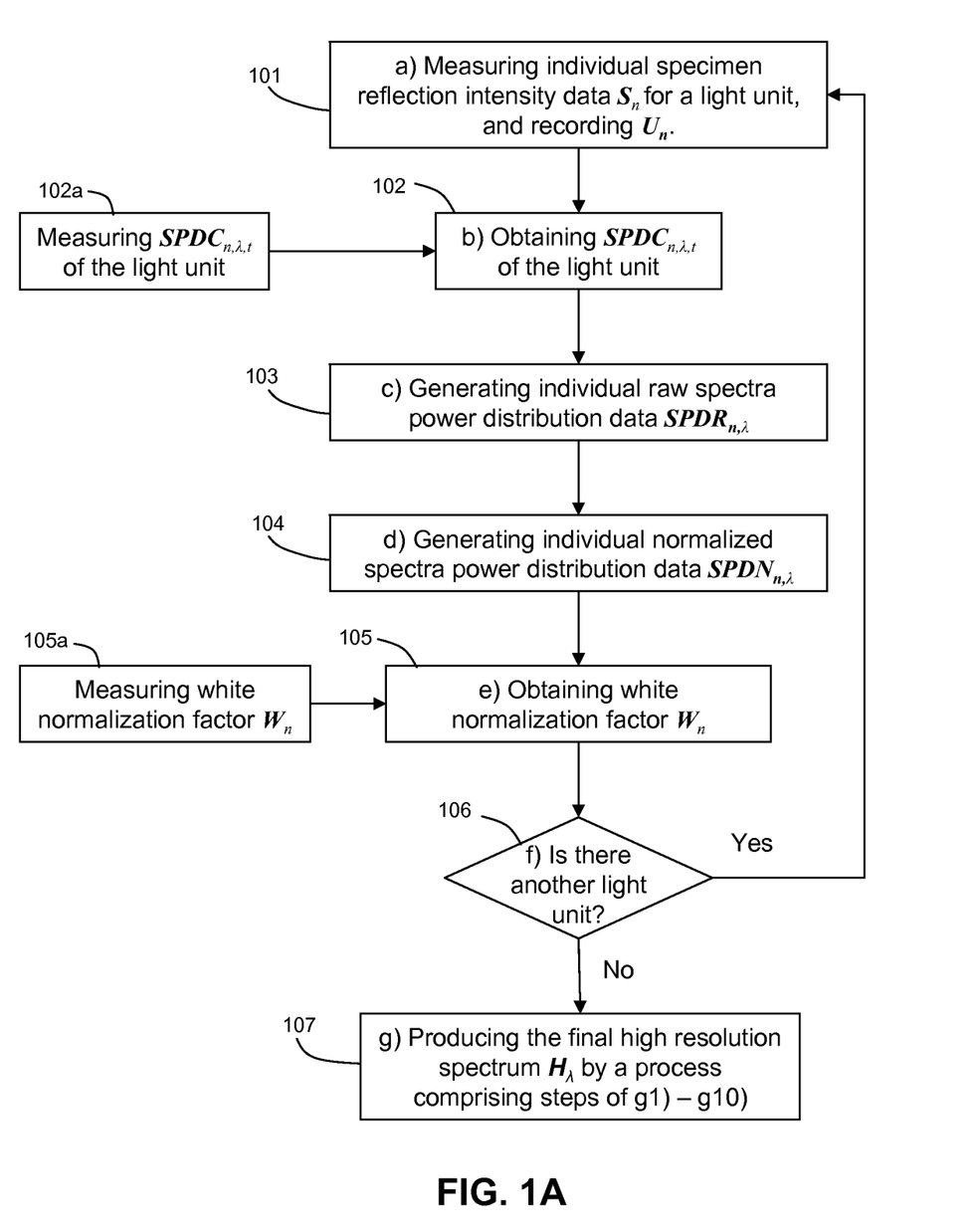

The $SPDC_{n,\lambda,t}$ can also be measured (102a) over a range of $\lambda$ for each of the k light emitting units at one or more known temperatures. The wavelength $\lambda$ can be in a range of from 380 nm to 760 nm, a typical wavelength range for visible lights. The light emitting diodes (LEDs) can be preferred light emitting units. When LEDs are used, the voltage applied to the light emitting units, such as the $V_{n,t}$ or $U_n$ can be an anode voltage. In one example, a series of $SPDC_{n,\lambda,t}$ can be measured for a plurality of light emitting diodes (LEDs) under a number of known voltages at one or more temperatures t over a range of wavelength $\lambda$.

One or more light emitting units can be configured into a lighting system wherein the light emitting units can be turned on and off as one unit or each of the light emitting units can be turned on and off individually.

The $SPDC_{n,\lambda,t}$ can be obtained or measured for each of the light emitting units before or after they are installed into a color measuring device.

In step c) (103) (FIG. 1A), the individual raw spectral power distribution data $SPDR_{n,\lambda}$ of a light unit can be generated based on said $SPDC_{n,\lambda,t}$ and the $U_n$. The temperature for the light unit under the voltage $U_n$ can be obtained by interpolation of $SPDC_{n,\lambda,t}$, the associated temperatures, and the $U_n$.

In step d) (104) (FIG. 1A), the individual normalized spectral power distribution data $SPDN_{n,\lambda}$ of the number n light unit can be generated by normalizing the $SPDR_{n,\lambda}$. Such normalization can be done by normalizing the area-under-the curve equal to a predetermined value. In one example, the area-under-the curve can be equal to 1. In another example, the area-under-the curve for the $SPDR_{n,\lambda}$ of each of the light units can be normalized to be of a predetermined value.

In step e) (105) (FIG. 1A), the individual white normalization factor $W_n$ of the number n light unit can be obtained. The white normalization factor $W_n$ can be obtained from a manufacturer of a color measuring device or reference standards. If not readily available, the white normalization factor $W_n$ can be generated (105a) by the steps of:

e1) obtaining individual reference reflection intensity data $S_n'$ of lights emitted from said number n light unit and reflected by a white reference standard having a reflection factor $WR_n$; and e2) generating the $W_n$ using the formula (vi):

$$W_n = \frac{WR_n}{S_n'}. \quad \text{(vi)}$$

The reflection factor $WR_n$ can be 1 or approach 1 when the white reference standard is perfectly white. The reflection factor $WR_n$ can be provided by a manufacturer of the white reference standard or by measurement.

In step f) (106) (FIG. 1A), a subsequent light unit can be measured by repeating the steps a) through e). A k number of the light emitting units can be measured, wherein k can be in a range of from 1 to 100. For a color measuring system, the k can be in a range of from 1 to 100, preferably in a range of from 1 to 50, further preferably in a range of from 1 to 30, yet further preferably in a range of from 5 to 25, even further preferably in a range of from 6 to 20. In one example, a white light unit that produces lights having mixed wavelengths can be used. In another example, a plurality of light units that each produces lights having different wavelengths can be used. Currently, a typical color measuring instrument can require 30 or more light emitting units, such as LEDs for acceptable color measurements. With the method of this disclosure, less light emitting units, such as less than 30, can be used in a color measurement device. The number of light emitting units in a range of from 6 to 20 can be suitable for the method of this disclosure.

Figure 1B:
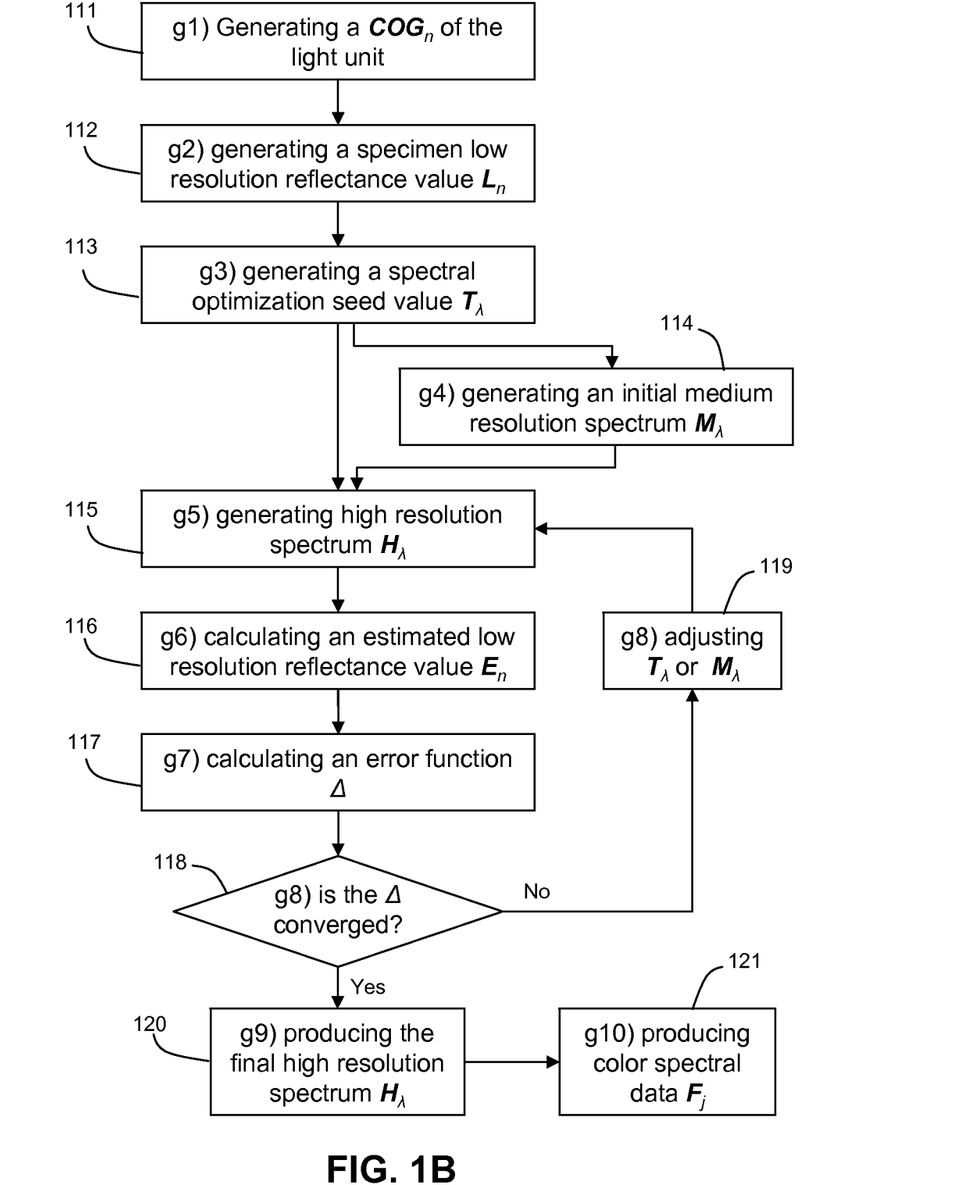
Figure 2A:
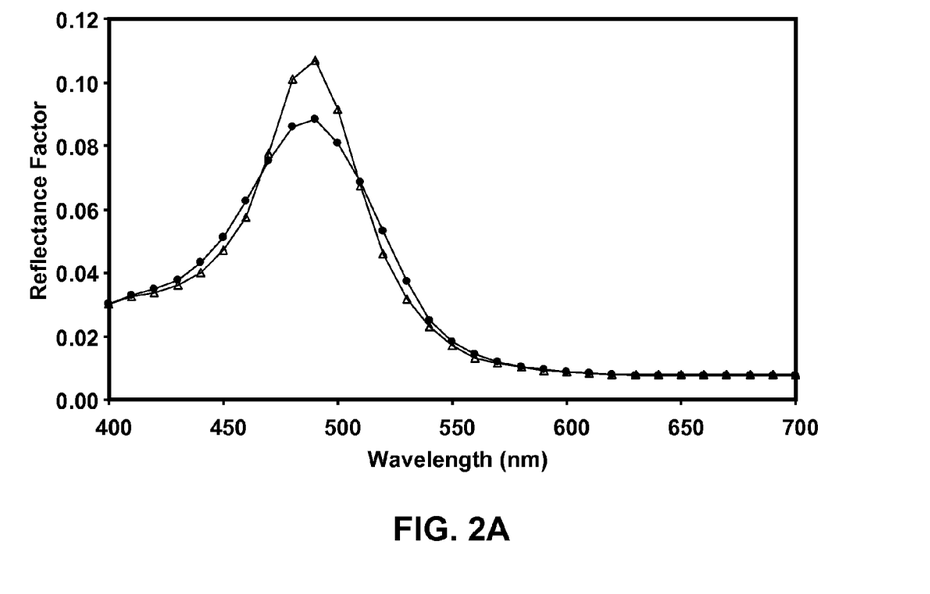
Figure 2B:
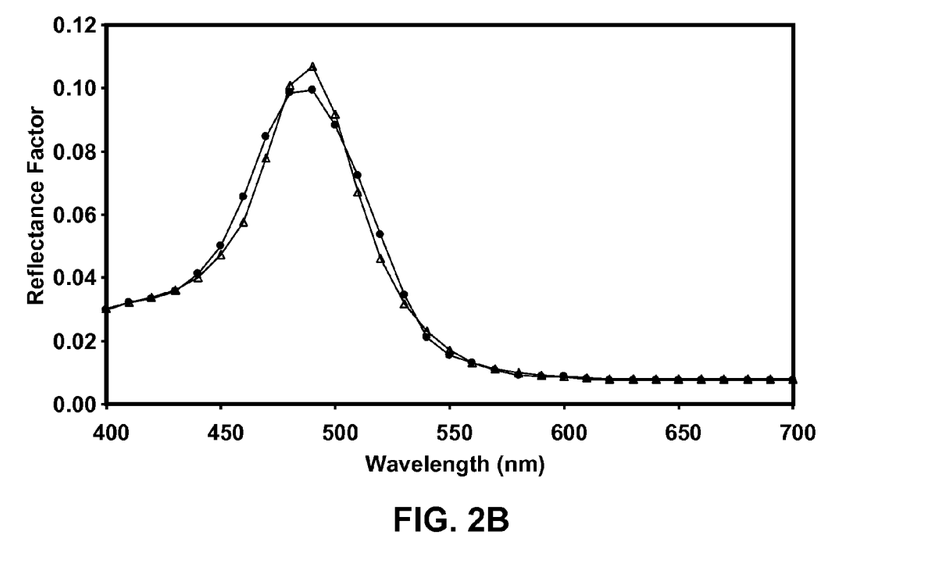
Figure 2C:
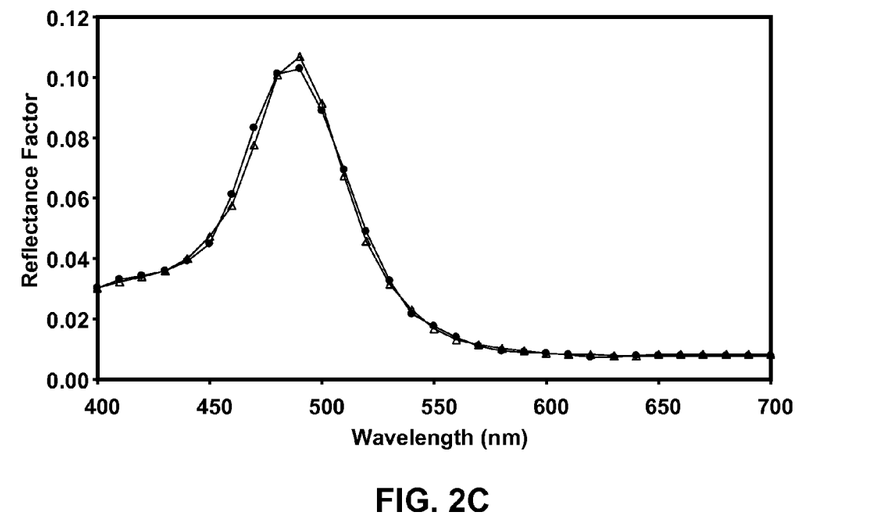
Figure 2D:
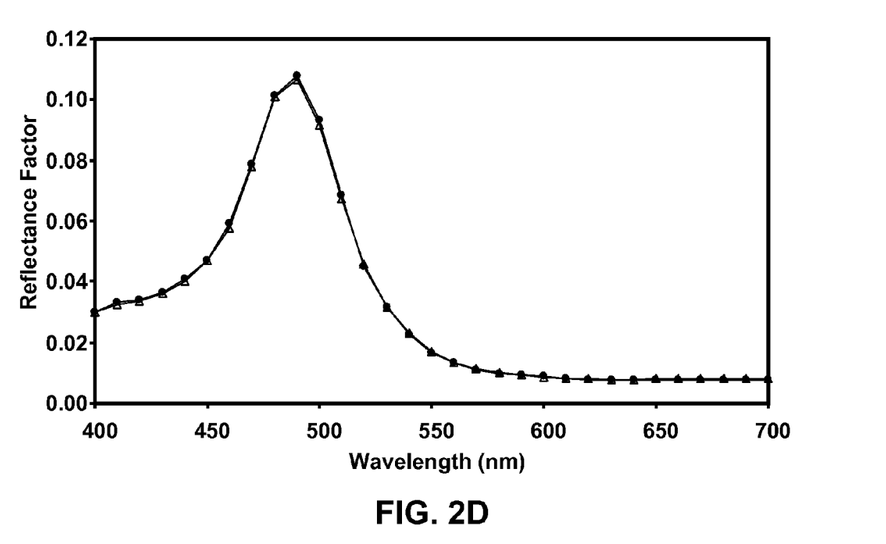

In step g) (107) (FIG. 1A), the high resolution reflectance spectrum $H_\lambda$ can be produced. The $H_\lambda$ can be produced based on the spectral optimization seed value $T_\lambda$, or optionally based on the initial medium resolution spectrum $M_\lambda$ when the error function $\Delta$ is converged, by a process comprising the steps g1) (111) through g9) (120) (FIG. 1B) as describe above. The $H_\lambda$ can be also be produced based on the subsequent $T_\lambda$ or the subsequent $M_\lambda$. In one example, the high resolution reflectance spectrum $H_\lambda$ can be based on the $M_\lambda$ or the subsequent $M_\lambda$ that lead to the converged error function $\Delta$. In another example, the high resolution reflectance spectrum $H_\lambda$ can be based on the $T_\lambda$ or the subsequent $T_\lambda$ that lead to the converged error function $\Delta$. It is understood that in order to generate a suitable high resolution reflectance spectrum $H_\lambda$ based on $T_\lambda$, the $T_\lambda$ needs to be at a sufficient resolution such as in a range of from 5 to 20 nm, preferably in a range of from 5 to 15 nm, further preferably in a range of from 5 to 10 nm. A $T_\lambda$ having a higher resolution can be generated from a $T_\lambda$ having a lower resolution by interpolation, and vise versa. For example, A $T_\lambda$ having a high resolution in a range of from 5 to 10 nm can be generated from a $T_\lambda$ having a low resolution in a range of from 15 to 20 nm by interpolation, and vise versa. Similarly, the $H_\lambda$ and the $M_\lambda$ having different resolutions can also be generated or converted from one to another by interpolation.

The $T_\lambda$ can be the same as $L_n$ at wavelengths defined by $COG_n$.

The term "converged" as used herein means that the error function $\Delta$ is at or approaching a minimum value. A number of iterations can be needed to determine whether the error function $\Delta$ is converged. In one example, the medium resolution spectrum $M_\lambda$ can be adjusted for 2 to 50 iterations in order to achieve the converged error function $\Delta$. In another example, the medium resolution spectrum $M_\lambda$ can be adjusted for 2 to 4 iterations to achieve the converged error function $\Delta$. In yet another example, the $T_\lambda$ can be adjusted for 1 to 4 iterations to achieve the converged error function $\Delta$.

The method can further comprise the step of: g10) producing a color spectral data $F_j$ (121) (FIG. 1B) from the formula (v) based on the high resolution spectrum $H_\lambda$ and a slit function $B_{j,\lambda}$, $$F_j = \frac{\sum_{\lambda=380}^{760} H_\lambda \times B_{j,\lambda}}{\sum_{\lambda=380}^{760} B_{j,\lambda}}; \quad (v)$$

wherein:

the color spectral data $F_j$ match a target color spectral data of said article produced from a target color measuring instrument having the slit function $B_{i,\lambda}$ and a second set of one or more light emitting units.

The slit function $B_{i,\lambda}$ is related to how lights are detected in the target color measuring instrument that has one or more slits for passing or detecting lights and can be available from the target color measuring instrument or from a manufacturer of the instrument. The slit function $B_{i,\lambda}$ can also be derived empirically, from mathematical models or computational models, or a combination thereof.

The target color measuring instrument can be any color measuring instrument and can include, for example, commercially available color measuring instruments, such as Byk-MAC from Byk-Gardener, Columbia, Md., USA, X-Rite MA68II and X-Rite MA90BR available from X-Rite, Grand Rapids, Mich., USA.

The color spectral data $F_j$ can also be produced from $H_\lambda$ empirically, from mathematical models or computational models, or a combination thereof. The mathematical models or computational models can include one or more artificial neural networks (ANN), also referred to as "neural network" (NN). The color spectral data $F_j$ can be generated using the artificial neural network trained with $H_\lambda$ values and corresponding $F_j$ values by developing an empirical neural net model which maps one or more $H_\lambda$ as input values to one or more $F_j$ as output values. The empirical neural net model can be trained based on a training set of colors covering an appropriate color gamut.

The first set and the second set of one or more light emitting units can be the same or different. The first set and the second set of light units can be the same or different types of light units, such as incandescent lights or LEDs. The first set and the second set of light units can also be the same or different numbers of light units. The first set and the second set of light units can also be the same or different in a combination of numbers and types of light units. In one example, the first set and the second set of light units can be the same. In another example, the first set and the second set of light units can be different, such as one being LEDs and the other being incandescent lights. In yet another example, the first set and the second set of light units can be different, such as being different types of LEDs. In a further example, the first set and the second set of light units can be in different number of lights.

The individual specimen reflection intensity data $S_n$ can be measured at one or more detection angles in a range of from −15° to 115° from the aspecular reflection using one or more detectors. In one example, one detector can be used to measure the reflection intensity at one or more detection angles. In another example, a plurality of detectors can be positioned at predetermined positions to measure reflection intensities at predetermined detection angles. Typically, measurements can be taken at 1-10 nm wavelength intervals from 380 nm to 760 nm wavelength. A plot of the percent reflectance as a function of wavelength can be referred to as a "spectral curve", "spectral reflectance data" or "reflection intensity data". For a solid color (non-flake or non-gonioapparent color, such as that lacking metallic flakes), one spectral curve at one detection angle can be typically sufficient to measure solid color properties. Other common geometries of measurement are diffuse illumination with 0° or 8° viewing or the reverse. If a target coating having flakes, i.e., gonioapparent color is being measured, reflectance measurements at additional angles can be necessary. ASTM E-2194 recommends three angles, 15°, 45°, and 110° as measured away from the aspecular reflection. DIN 6175-2 recommends up to five angles in a range of from 15° to 115° from the aspecular reflection. Some commercial devices, such as X-Rite MA68II can provide measurements at 15°, 25°, 45°, 75°, and 110°. It is preferred that individual specimen reflection intensity data $S_n$ be measured at one or more detection angles in a range of from 15° to 110°. It is further preferred that individual specimen reflection intensity data $S_n$ be measured at one or more detection angles selected from 15°, 25°, 45°, 75°, 110°, or a combination thereof, from the aspecular reflection.

The method of this disclosure can further comprise the step of outputting said color spectral data $F_j$ to an output device. The output device can include, but not limited to, a computer monitor, a projector, a TV screen, a personal digital assistant (PDA) device, a cell phone, a smart phone that combines PDA and cell phone, an iPod, an iPod/MP Player, a flexible thin digital display, or any other devices that can display or output information or images based on digital signals. The output device can also be a printing device that prints, based on digital signals, information or image onto papers, plastics, textiles, or any other surfaces that are suitable for printing the information or images onto. The output device can also be a duel functional display/data input device, such as a touch screen. The output device can also be a conventional paper or plotting paper. The output device can also be a computing device, such as a desktop computer, a laptop computer, or a PDA; a data storage device, such as a hard drive, an compact disk (CD), a DVD, a memory device such as a USB flash card, or any other types of digital data storage devices; or a memory device, such as a computer RAM. The spectral optimization seed value $T_\lambda$, the subsequent $T_\lambda$, the initial medium resolution spectrum $M_\lambda$, the subsequent $M_\lambda$, or a combination thereof, can also be out putted to any of the aforementioned output devices. Any of the aforementioned values, intermediate data or results, including, but not limited to, the $V_{n,t}$, $U_n$, $COG_n$, $W_n$, $WR_n$, $T_\lambda$, $S_n$, $L_n$, $M_\lambda$, $H_\lambda$, $E_n$, $\Delta$, $F_j$, $B_{j,\lambda}$, $B_{j,\lambda}$, $SPDR_{n,\lambda}$, $SPDN_{n,\lambda}$, or a combination thereof, can also be out putted to any of the aforementioned output devices.

The spectral reflectance data can be converted into color space data such as XYZ values, L,a,b values, L*,a*,b* or L,C,h values as described in detail in U.S. Pat. No. 7,466,415, which is herein incorporated by reference. The method of this disclosure can further comprise the step of generating color space data values based on said color spectral data $F_j$, said color space data values can be selected from XYZ values, L,a,b values, L*,a*,b* values, L,C,h values or a combination thereof.

The method disclosed herein can provide color spectral data of an article. The color spectral data generated by the method can be highly reproducible and can match a target color data produced from a target color measuring instrument having a slit function $B_{j,\lambda}$. The target color measuring instrument can have the same of different light emitting units. The method can be useful for calibrating a color measuring device based on a know target color measuring instrument. The method disclosed herein can be integrated into a color measuring system that can use less number of light emitting units therefore reducing the cost and the size of the color measuring system. The color measuring system using the method of this disclosure can use less than 30 light emitting units, in a range of from 5 to 30, further preferably in a range of from 5 to 25, and even preferably in a range of from 6 to 20 light emitting units.

The article can be a substrate coated with one or more coating layers formed from one or more coating compositions. At least one of the coating compositions can comprise one or more pigments, effect pigments, pearlescent pigments, or a combination thereof. Some examples of articles can include, but not limited to: home appliances, such as refrigerator, washing machine, dishwasher, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets. Other examples of the articles can include, but not limited to, engineering polymers, injection molding plastics or polymers, or other synthetic materials. The substrate can be a vehicle body or a vehicle body part.

This disclosure is further directed to a color measuring system for producing color spectral data of an article using the method of this disclosure. The color measuring system can comprise one or more light emitting units and a computing program product causing said color measuring system performing a computing process according to the method of this disclosure. The color measuring system can further comprise one or more light detectors, one or more built-in computing devices, and other devices or accessories including communication means for communicating among the light emitting units, the detectors, the computing device and other devices or accessories.

The method of this disclosure can be programmed into a computing program product and stored in a built-in computing device or a digital storage device of a color measuring system. The color spectral data $(F_j)$, $COG_n$, the initial or the subsequent $T_\lambda$, the $S_n$, the $L_n$, the initial or the subsequent $M_\lambda$, the initial and the final $H_\lambda$, the $SPDR_{n,\lambda}$, the $SPDN_{n,\lambda}$, or a combination thereof, can be generated by the built-in computing device and be an output product of the color measuring system.

The method of this disclosure can also be programmed into a computing program product and stored in a second computing device different from the built-in computing device. Some data can be measured, processed and transmitted to the second computing device. The data can be transmitted to the second computing device via wired or wireless connection means known to or developed by those skilled in the art. The second computing device can be a desktop computer or a portable computing device. Examples of the portable computing device can include a laptop computer, a tablet computing device, a cell phone, a smart phone, a personal digital assistant (PDA), or a combination thereof.

This disclosure is also directed to a process for producing one or more matching formulations to match a color of an article. The process can comprise the steps of producing color spectral data of the article according to any of the methods disclosed herein. Getting accurate and reproducible color spectral data is important for color matching, for example for producing a matching formulation matching color of a vehicle to be repaired. With the color spectral data, a matching formulation can be retrieved or developed. The color space data values generated based on the color spectral data $F_j$, the medium resolution reflectance spectrum $M_\lambda$, the high resolution reflectance spectrum $H_\lambda$, or a combination thereof, can be used to retrieve or to develop a matching formulation. The color space data values can be selected from XYZ values, L,a,b values, L*,a*,b* values, L,C,h values, or a combination thereof.

This disclosure is also directed to a matching formulation for matching a color of an article. The matching formulation can be produced by the aforementioned process. A coating composition can be prepared according to the matching formulation. An article can be coated or repaired with the coating composition. The article being measured for the color spectral data and the article being coated with the coating composition can be the same or different. In one example, color spectral data can be measured from an antique car and a different new vehicle can coated with a coating composition matching the color of the antique car. In another example, color spectral data can be measured from a coating of a car, and a coating defect in the same coating can be repaired using the coating composition developed from the method disclosed herein.

This disclosure is also directed to an article coated with a coating composition produced according to the aforementioned matching formulation. The article can be any of the aforementioned articles. For example, an article can be a vehicle or any other items coated with the aforementioned coating composition.

EXAMPLES

The present disclosure is further defined in the following Examples. It should be understood that these Examples, while indicating preferred embodiments of the disclosure, are given by way of illustration only. From the above discussion and these Examples, one skilled in the art can ascertain the essential characteristics of this disclosure, and without departing from the spirit and scope thereof, can make various changes and modifications of the disclosure to adapt it to various uses and conditions.

A subset of 20 LEDs from a Byk-MAC color measurement device available from BYK-Gardner, Columbia, Md., USA, were used. Each of the 20 LEDs can be turned on and off individually. Individual specimen reflection intensity data $S_n$ of the light emitted from each of the LEDs and reflected by an aluminum panel painted with a blue solid color refinish quality paint were measured with a detector arranged to detect reflectance at a detection angle of 45°. Individual raw spectral power distribution data $SPDR_{n,\lambda}$ of the LEDs, individual normalized spectral power distribution data $SPDN_{n,\lambda}$ were calculated. The white standard reflectance factor $WR_n$ was obtained from the manufacturer of the white reference standard supplied with the Byk-MAC.

A commercial color measurement instrument X-Rite model MA90BR available from X-Rite, Grand Rapids, Mich., USA was used as a target color measuring instrument to generate a target color spectral data of the same aluminum panel. The target color spectral data are shown in FIGS. 2A-2D with the triangle symbols.

The color spectral data produced with the method disclosed herein with the slit function from the X-Rite model MA90BR are shown in FIG. 2 with solid circle symbols. The initial seed data are shown in FIG. 2A. The color spectral data after 2 and 4 iterations are shown in FIGS. 2B and 2C. The final converged color spectral data are shown in FIG. 2D.

What is claimed is:

1. A method for producing color spectral data of an article, said method comprising the steps of:
a) measuring individual specimen reflection intensity data $S_n$ of lights emitted from a number n light unit of a first set of one or more light emitting units and reflected by said article using one or more detectors, said $S_n$ is measured over a range of wavelength $\lambda$ and under a voltage $U_n$ applied to said number n light unit;
b) obtaining individual characterized spectral power distribution data $SPDC_{n,\lambda,t}$ of said number n light unit, said $SPDC_{n,\lambda,t}$ characterizes the number n light unit over the range of wavelength $\lambda$, at one or more known temperatures t and under one or more individual voltages $V_{n,t}$ applied to said number n light unit;
c) generating individual raw spectral power distribution data $SPDR_{n,\lambda}$ of said number n light unit based on said $SPDC_{n,\lambda,t}$ and the $U_n$;
d) generating individual normalized spectral power distribution data $SPDN_{n,\lambda}$ of the number n light unit by normalizing said $SPDR_{n,\lambda}$;
e) obtaining an individual white normalization factor $W_n$ of the number n light unit;
f) repeating the steps of a) through e) for k light units of said first set of one or more light emitting units; and
g) producing a high resolution spectrum $H_\lambda$ for said k light units by a process comprising the steps of:
g1) generating a $COG_n$ of the number n light unit using the formula (i):

$$COG_n = \frac{\sum_{\lambda=380}^{760} \lambda \times SPDN_{n,\lambda}}{\sum_{\lambda=380}^{760} SPDN_{n,\lambda}}; \quad (i)$$

g2) generating a specimen reflectance value $L_n$ unit using the formula (ii):

$$L_n = S_n \times W_n \quad (ii);$$

g3) generating a spectral optimization seed value $T_\lambda$ by interpolating said $COG_n$ and said $L_n$;
g4) optionally, generating an initial medium resolution spectrum $M_\lambda$ based on the $T_\lambda$;
g5) generating an initial high resolution spectrum $H_\lambda$ by interpolating from the spectral optimization seed value $T_\lambda$, or optionally from the initial medium resolution spectrum $M_\lambda$;
g6) calculating an estimated low resolution reflectance value $E_n$ at each $COG_n$ using the formula (iii):

$$E_n = \sum_{\lambda=380}^{760} H_\lambda \times SPDN_{n,\lambda}; \quad (iii)$$

g7) calculating an error function $\Delta$ using the formula (iv):

$$\Delta = \sum_{n=1}^{k} (E_n - L_n)^2; \quad (iv)$$

g8) adjusting the spectral optimization seed value $T_\lambda$ to a subsequent $T_\lambda$, or optionally adjusting the initial medium resolution spectrum $M_\lambda$ to a subsequent $M_\lambda$, and repeating steps g5) through g7) using the subsequent $T_\lambda$ to replace the spectral optimization seed value $T_\lambda$ or using the subsequent $M_\lambda$ to replace the initial medium resolution spectrum $M_\lambda$, if the error function $\Delta$ in step g7) is not converged; and
g9) producing said high resolution spectrum $H_\lambda$ based on the spectral optimization seed value $T_\lambda$ or the subsequent $T_\lambda$, or optionally, based on said initial medium resolution spectrum $M_\lambda$ or said subsequent $M_\lambda$, when the error function $\Delta$ is converged;
wherein:
k is the number of the light emitting units measured;

n is an index of the light emitting units and is in a range of from 1 to k;

λ is a wavelength of lights in a range of from 380 nm to 760 nm.

2. The method of claim 1 further comprising the step of:
g10) producing a color spectral data $F_j$ from the formula (v) based on said high resolution spectrum $H_\lambda$ and a slit function $B_{j,\lambda}$, $$F_j = \frac{\sum_{\lambda=380}^{760} H_\lambda \times B_{j,\lambda}}{\sum_{\lambda=380}^{760} B_{j,\lambda}}; \quad (v)$$

wherein:
said color spectral data $F_j$ match a target color spectral data of said article produced from a target color measuring instrument having the slit function $B_{j,\lambda}$ and a second set of one or more light emitting units.

3. A method of claim 1 further comprising the steps of producing a color spectral data $F_j$ from the formula (v) based on said high resolution spectrum $H_\lambda$ using an artificial neural network trained with $H_\lambda$ values and corresponding $F_j$ values.

4. The method of claim 2 or 3 further comprising the step of generating color space data values based on said color spectral data $F_j$, said color space data values are selected from XYZ values, L,a,b values, L*,a*,b* values, L,C,h values, or a combination thereof.

5. The method of claim 2 or 3 further comprising the step of outputting said color spectral data $F_j$ to an output device.

6. The method of claim 1, wherein said individual white normalization factor $W_n$ of the number n light unit is generated by the steps of:
e1) obtaining individual reference reflection intensity data $S_n'$ of lights emitted from said number n light unit and reflected by a white reference standard having a reflection factor $WR_n$; and
e2) generating the $W_n$ using the formula (vi):

$$W_n = \frac{WR_n}{S_n'}. \quad (vi)$$

7. The method of claim 6, wherein said individual reference reflection intensity data $S_n'$ is measured at one or more detection angles in a range of from 15° to 115° from the aspecular reflection.

8. The method of claim 6, wherein said individual reference reflection intensity data $S_n'$ is measured at one or more detection angles selected from 15°, 25°, 45°, 75°, 110°, or a combination thereof, from the aspecular reflection.

9. The method of claim 1, wherein said individual normalized spectral power distribution data $SPDN_{n,\lambda}$ of the number n light unit is generated by normalizing said $SPDR_{n,\lambda}$ to an area-under-the curve equal to a predetermined value.

10. The method of claim 1, wherein said individual specimen reflection intensity data $S_n$ is measured at one or more detection angles in a range of from 15° to 115° from the aspecular reflection.

11. The method of claim 1, wherein said individual specimen reflection intensity data $S_n$ is measured at one or more detection angles selected from 15°, 25°, 45°, 75°, 110°, or a combination thereof, from the aspecular reflection.

12. The method of claim 1 further comprising the step of generating color space data values based on said high resolution spectrum $H_\lambda$, said color space data values are selected from XYZ values, L,a,b values, L*,a*,b* values, L,C,h values, or a combination thereof.

13. A process for matching a color an article, said process comprising the steps of producing color spectral data of said article according to the method of any one of the claims 1-2, 3 and 6-11, 12.

14. A process for producing one or more matching formulations to match a color an article, said process comprising the steps of producing color spectral data of said article according to the method of any one of the claims 1-2, 3 and 6-11, 12.

15. A color measuring system for producing color spectral data of an article, said color measuring system comprising:
one or more light emitting units;
one or more light detectors;
an output device;
one or more computing devices communicating among the light emitting units, the light detectors, the output device and each of the computing devices; and
a non-transitory computing program product comprising computer executable codes, when in operation, causing said one or more computing devices of said color measuring system to perform a computing process comprising the steps of:
a) receiving from the light detectors individual specimen reflection intensity data $S_n$ of lights emitted from a number n light unit of a first set of one or more light emitting units and reflected by said article, said $S_n$ is measured over a range of wavelength λ and under a voltage $U_n$ applied to said number n light unit;
b) receiving individual characterized spectral power distribution data $SPDC_{n,\lambda,t}$ of said number n light unit, said $SPDC_{n,\lambda,t}$ characterizes the number n light unit over the range of wavelength λ, at one or more known temperatures t and under one or more individual voltages $V_{n,t}$ applied to said number n light unit;
c) generating individual raw spectral power distribution data $SPDR_{n,\lambda}$ of said number n light unit based on said $SPDC_{n,\lambda,t}$ and the $U_n$;
d) generating individual normalized spectral power distribution data $SPDN_{n,\lambda}$ of the number n light unit by normalizing said $SPDR_{n,\lambda}$;
e) receiving an individual white normalization factor $W_n$ of the number n light unit;
f) repeating the steps of a) through e) for k light units of said first set of one or more light emitting units; and
g) producing a high resolution spectrum $H_\lambda$ for said k light units by a process comprising the steps of:
g1) generating a $COG_n$ of the number n light unit using the formula (i):

$$COG_n = \frac{\sum_{\lambda=380}^{760} \lambda \times SPDN_{n,\lambda}}{\sum_{\lambda=380}^{760} SPDN_{n,\lambda}}; \quad (i)$$

g2) generating a specimen reflectance value $L_n$ unit using the formula (ii):

$$L_n = S_n \times W_n \quad (ii);$$

g3) generating a spectral optimization seed value $T_\lambda$ by interpolating said $COG_n$ and said $L_n$;

g4) optionally, generating an initial medium resolution spectrum $M_\lambda$ based on the $T_\lambda$;

g5) generating an initial high resolution spectrum $H_\lambda$ by interpolating from the spectral optimization seed value $T_\lambda$, or optionally from the initial medium resolution spectrum $M_\lambda$;

g6) calculating an estimated low resolution reflectance value $E_n$ at each $COG_n$ using the formula (iii):

$$E_n = \sum_{\lambda=380}^{760} H_\lambda \times SPDN_{n,\lambda}; \qquad \text{(iii)}$$

g7) calculating an error function $\Delta$ using the formula (iv):

$$\Delta = \sum_{n=1}^{k} (E_n - L_n)^2; \qquad \text{(iv)}$$

g8) adjusting the spectral optimization seed value $T_\lambda$ to a subsequent $T_\lambda$, or optionally adjusting the initial medium resolution spectrum $M_\lambda$ to a subsequent $M_\lambda$, and repeating steps g5) through g7) using the subsequent $T_\lambda$ to replace the spectral optimization seed value $T_\lambda$ or using the subsequent $M_\lambda$ to replace the initial medium resolution spectrum $M_\lambda$, if the error function $\Delta$ in step g7) is not converged; and g9) producing said high resolution spectrum $H_\lambda$, based on the spectral optimization seed value $T_\lambda$ or the subsequent $T_\lambda$, or optionally, based on said initial medium resolution spectrum $M_\lambda$ or said subsequent $M_\lambda$, when the error function $\Delta$ is converged;

wherein:

k is the number of the light emitting units measured;

n is an index of the light emitting units and is in a range of from 1 to k;

$\lambda$ is a wavelength of lights in a range of from 380 nm to 760 nm.

16. The color measuring system of claim 15, wherein said one or more light emitting units are light emitting diodes (LEDs).

17. The color measuring system of claim 15, wherein said computer program product further comprises computer executable codes, when in operation, causing said one or more computing devices to perform a computing process of:

g10) producing a color spectral data $F_j$ from the formula (v) based on said high resolution spectrum $H_\lambda$ and a slit function $B_{j,\lambda}$, $$F_j = \frac{\sum_{\lambda=380}^{760} H_\lambda \times B_{j,\lambda}}{\sum_{\lambda=380}^{760} B_{j,\lambda}}; \qquad \text{(v)}$$

wherein:

said color spectral data $F_j$ match a target color spectral data of said article produced from a target color measuring instrument having the slit function $B_{j,\lambda}$ and a second set of one or more light emitting units.

18. The color measuring system of claim 17, wherein said first set and said second set of one or more light emitting units are the same or different.

19. The color measuring system of claim 15, wherein said computer program product further comprises computer executable codes, when in operation, causing said computing devices to perform a computing process of:

generating said individual white normalization factor $W_n$ of the number n light unit by the steps of:

e1) receiving individual reference reflection intensity data $S_n'$ of lights emitted from said number n light unit and reflected by a white reference standard having a reflection factor $WR_n$; and e2) generating the $W_n$ using the formula (vi):

$$W_n = \frac{WR_n}{S_n'}. \qquad \text{(vi)}$$

\* \* \* \* \*